US009431997B1

(12) United States Patent
Comeau et al.

(10) Patent No.: US 9,431,997 B1
(45) Date of Patent: Aug. 30, 2016

(54) INTERFERENCE SIGNAL CANCELLOR WITH ACTIVE TUNABLE NOTCH FILTER

(71) Applicant: Raytheon Company, Waltham, MA (US)

(72) Inventors: Jonathan P. Comeau, Winchester, MA (US); Robert G. Egri, Carlisle, MA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/737,756

(22) Filed: Jun. 12, 2015

(51) Int. Cl.
*H03K 5/00* (2006.01)
*B04B 1/00* (2006.01)
*H03H 11/04* (2006.01)
*H04B 1/10* (2006.01)

(52) U.S. Cl.
CPC ............ *H03H 11/04* (2013.01); *H04B 1/1009* (2013.01); *H04B 1/1018* (2013.01); *H04B 1/1027* (2013.01)

(58) Field of Classification Search
CPC .. H04B 1/123; H04B 1/1009; H04B 1/1018; H04B 1/1027
USPC ................. 327/551–559; 455/293, 302–311, 455/242.1, 222
See application file for complete search history.

(56) References Cited

U.S. PATENT DOCUMENTS

| 5,152,108 | A * | 10/1992 | Madl, Jr. ................. E02D 27/02 52/126.1 |
| 7,058,368 | B2 * | 6/2006 | Nicholls ................ H04B 1/525 375/296 |
| 7,373,131 | B2 * | 5/2008 | Matsuno ................ H03D 3/007 455/285 |
| 8,600,329 | B1 | 12/2013 | Comeau et al. |
| 8,929,847 | B2 * | 1/2015 | Chung ...................... H03F 1/26 455/296 |
| 9,306,607 | B2 * | 4/2016 | Egri ....................... H04B 1/123 |

OTHER PUBLICATIONS

Donald K. Weaver, Jr., A Third Method of Generation and Detection of Single-Sideband Signals, Proceedings of the IRE, Jun. 25, 1956, pp. 1703-1705.

* cited by examiner

*Primary Examiner* — Dinh T Le
(74) *Attorney, Agent, or Firm* — Daly, Crowley, Mofford & Durkee, LLP

(57) ABSTRACT

An interfering signal canceller for cancelling an interfering signal component of an input signal includes a voltage sensor element disposed in a primary path and fed by the input signal, a coupler disposed in the primary path and fed by the voltage sensor element, a Hartley image-reject element disposed in an auxiliary path and fed by the input signal for converting the input signal to an intermediate or baseband frequency signal, a phase slope compensator disposed in the auxiliary path after the Hartley image-reject element to allow broadband phase adjustment of the interfering signal component of a converted input signal, and an inverse Hartley image-reject element disposed in the auxiliary path after the phase phase slope compensator to convert the passed the interfering signal component to the predetermined band of frequencies and having an output fed to the coupler.

20 Claims, 7 Drawing Sheets

INTERFERENCE SIGNAL CANCELLOR WITH ACTIVE TUNABLE NOTCH FILTER

TECHNICAL FIELD

This disclosure relates generally to an interference signal canceller and more particularly to active cancellation of large signal interferers in RF and microwave receivers.

BACKGROUND

As is known in the art, there is a requirement in many applications for the active cancellation of large signal interferers in radio frequency (RF) and microwave receivers. Numerous active cancellation schemes based on feed-forward (see for example: S. Ayazian, and R. Gharpurey, "Feedforward interference cancellation in radio receiver front-ends," IEEE Transactions on Circuits and Systems-II Express Briefs, vol. 54, no. 10, pp. 902-906, October 2007 and H. Darabi, "A blocker filtering technique for SAW-less wireless receivers," IEEE Journal of Solid State Circuits, vol. 42, no. 12, pp. 2766-2773, December 2007) or feedback (see for example T. Werth, C. Schmits, R. Wunderlich, and S Heinen, "An active feedback interference cancellation technique for blocker filtering in RF receiver front-ends," IEEE Journal of Solid-State Circuits, vol. 45, no 5, pp. 989-997, May 2010) approaches have been developed, but incorporate a low-noise amplifier (or gain amplifier) in the primary signal path as a means to achieve cancellation. The incorporation of this active component in the primary signal path limits the power handling capabilities of the active cancellation circuitry. Similarly, many approaches only provide active cancellation for continuous wave (CW) signals or modulated/encoded signals based on relatively slow (<1 Mbps) modulation/encoding schemes, and require a finite amount of time for the cancellation to synchronize with the system. The ability to have the cancellation error signal generated and utilized in the cancellation approach within the first period of the interfering signal is highly desirable, as well as the ability to cancel moderate power (>10 dBm) interferers without the use of high-linearity (and high power) LNA's in the primary path.

As is also known in the art, feed-forward active cancellation is based on the ability to generate an error signal that is identical in amplitude and 180 degrees out of phase with the interfering signal, and then combine this error signal with the interfering signal to cancel it out. An approach previously developed is shown in FIG. 1. Here, the input signal (e.g., RF/microwave frequency having both the desired signal and the interfering signal of known radio frequency) is sampled and fed to an auxiliary path. The desired signal and the interfering signal in the auxiliary path are down-converted in frequency with in-phase (I) and quadrature (Q) local oscillator signals (LOI, LOQ) and a pair of mixers, as shown; with the interfering signal being converted to a known intermediate frequency (IF) or baseband frequency. The frequency down-converted signal is then amplified (or attenuated) to achieve the correct amplitude for maximum cancellation. The signal is also sent through a bandpass or lowpass filter, which is tuned to the known IF or baseband frequency, to filter out all other signals (i.e. the desired signal) leaving only the interferer/error signal in the auxiliary path. This remaining interfering signal is then up-converted in frequency by in-phase (I) and quadrature (Q) local oscillator signals (LOI, LOQ) and a pair of mixers, as shown, back to the RF/microwave frequency of interest (i.e., the original known interfering radio frequency) and combined with the full spectrum of the signal in the primary path (i.e., the input signal) to enable cancellation of the interfering signal in the primary path. As shown in FIG. 1, the auxiliary path performs both the frequency down-conversion and up-conversion in a pseudo-Weaver architecture (B. Razavi, "RF Microelectronics", Upper Saddle River, Prentice Hall, 1998), to address image rejection concerns during up-conversion. Both amplitude alignment and phase alignment of the interfering signal in the primary and auxiliary paths must also be addressed to achieve cancellation, either by minimizing the phase and amplitude variation in the two paths, or by compensating for the variation in the primary path or in the auxiliary path.

SUMMARY

In accordance with the present disclosure, an interfering signal canceller is provided for cancelling an interfering signal component of an input signal, having a predetermined band of frequencies, from a desired signal component of the input signal, wherein the input signal is fed to a primary path and an auxiliary path, the interfering signal canceller comprising: a voltage sensor element disposed in the primary path and fed by the input signal; a coupler disposed in the primary path and fed by the voltage sensor element; a Hartley image-reject down-converting element disposed in the auxiliary path and fed by the input signal for converting the input signal to an intermediate or baseband frequency signal; a phase slope compensator disposed in the auxiliary path after the Hartley image-reject element to phase adjust an interfering signal component of a converted input signal; an inverse Hartley image-reject up-converting element disposed in the auxiliary path after the phase slope compensator to convert the passed interfering signal component to the predetermined band of frequencies and having an output fed to the coupler.

In one embodiment, the canceller also includes an amplifier disposed in the auxiliary path between the Hartley image-reject element and the phase slope compensator.

In one embodiment, the canceller also includes an amplifier disposed in the auxiliary path between the voltage sensor and the Hartley image-reject element.

In one embodiment, the canceller also includes wherein the Hartley down-converting image-reject element comprises: a pair of mixers each having an output; a pair of amplifiers, each having an input and an output, the input connected to the respective outputs of a pair of mixers; and a polyphase filter having two inputs and an output, the two inputs fed by the respective one of the outputs of the pair of amplifiers, the output of the polyphase filter providing the input of the Hartley up-converting image-reject element.

In one embodiment, the canceller also includes a band pass filter disposed in the auxiliary path after the phase slope compensator, the band pass filter tuned to the interfering signal component of a converted input signal for passing the interfering signal component of the converted input signal and for suppressing the desired signal component of the converted input signal.

In one embodiment, the canceller also includes the inverse (up-converting) Hartley image-reject element comprising: a polyphase filter having an input and two outputs; a pair of amplifiers, each amplifier having an input and an output, the input connected to a respective output of the polyphase filter; a pair of phase rotators, each having an input and an output; a pair of mixers each having two inputs and an output; one of the inputs of one of the pair of mixers connected to a respective output of one of the pair of amplifiers and the other one of the inputs of one of the pair of mixers connected to a respective output of one of the pair of phase rotators; and a combiner to combine signals passed by the pair of mixers and to provide the output of the inverse Hartley up-converting image-reject element.

DESCRIPTION OF DRAWINGS

Like reference symbols in the various drawings indicate like elements.

DETAILED DESCRIPTION

Figure 1:
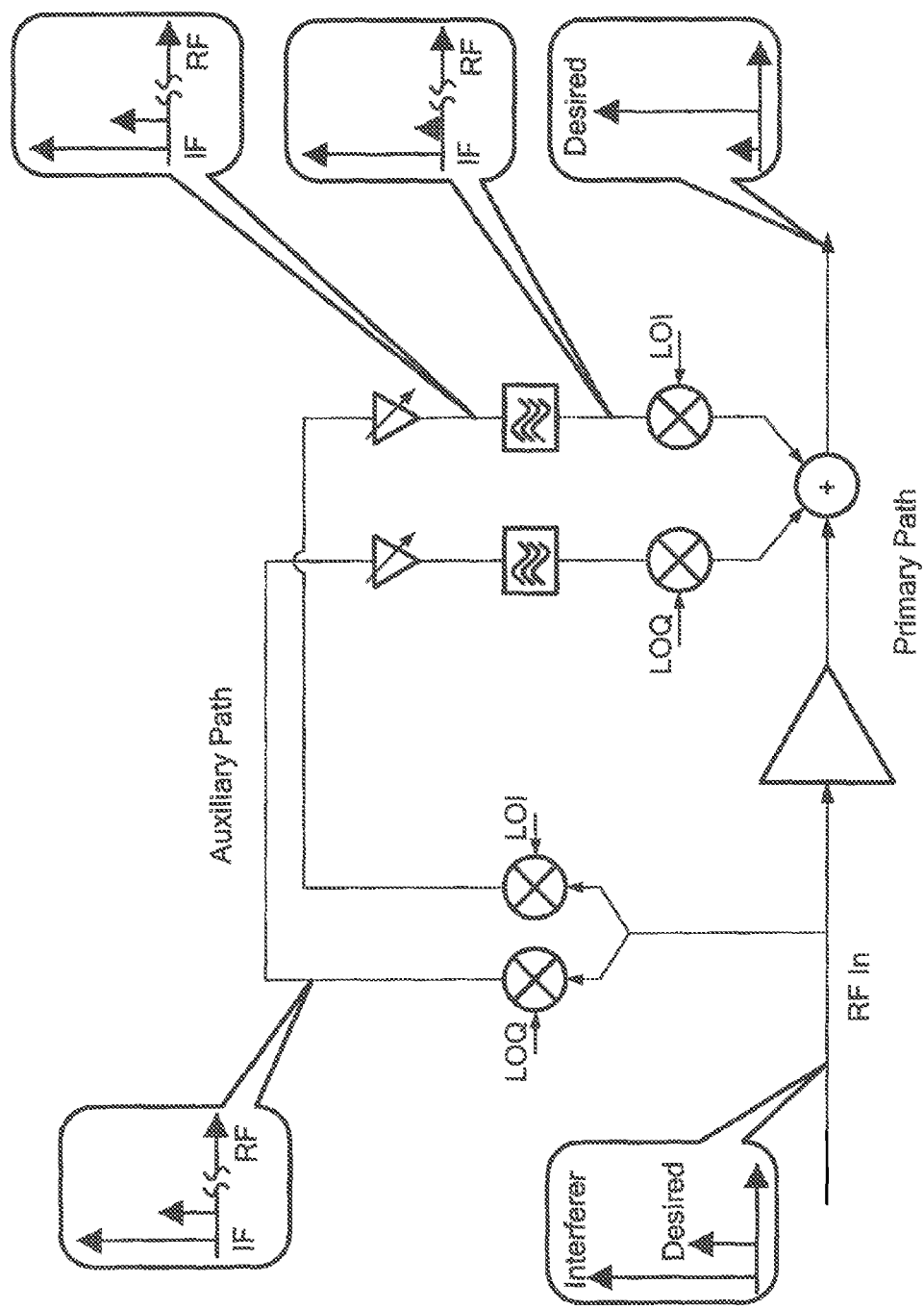
FIG. 1 is a block diagram of an interfering signal canceller according to the PRIOR ART.
Figure 2:
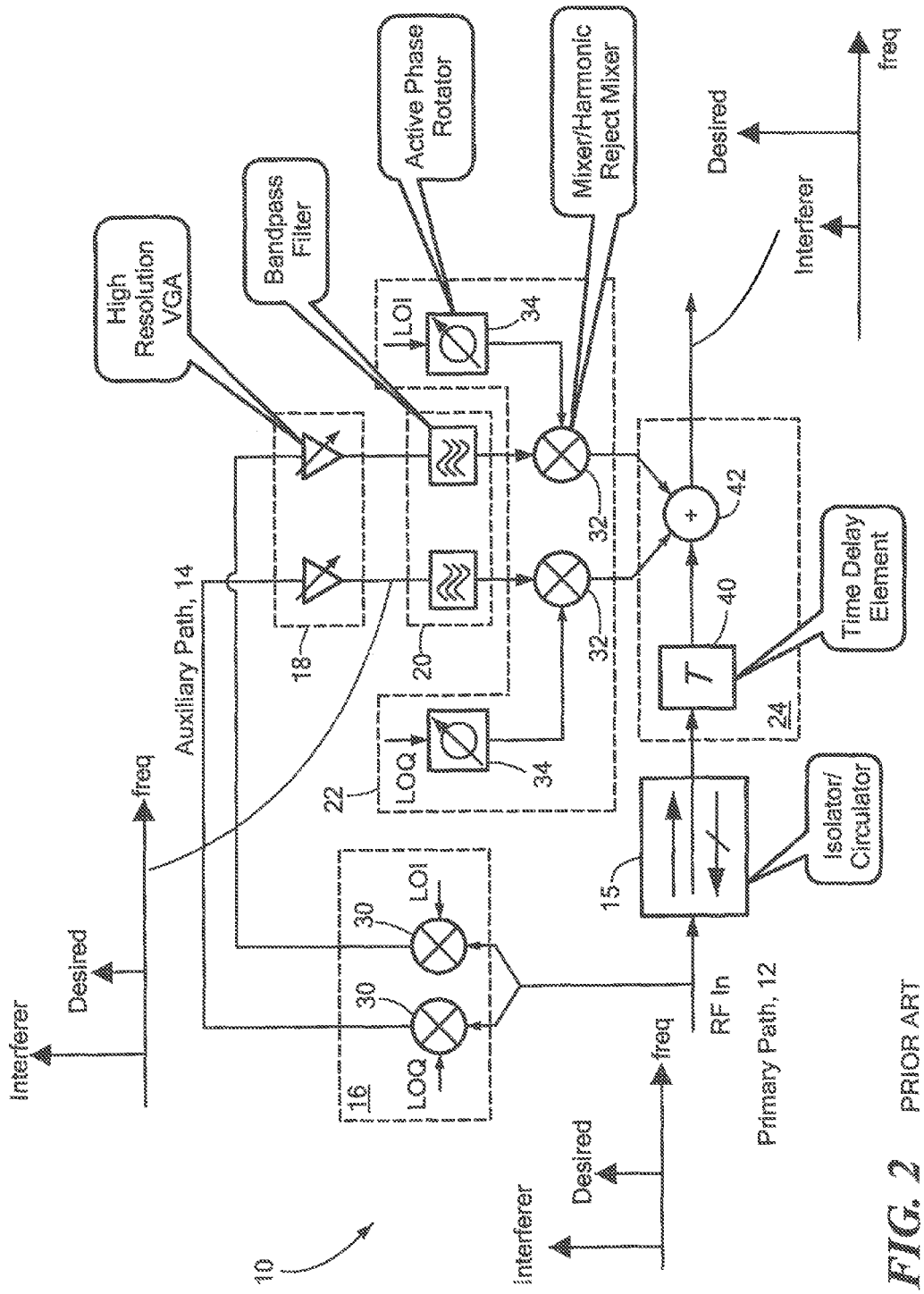
FIG. 2 is a block diagram of an interfering signal canceller according to an earlier disclosure in the PRIOR ART.

Referring now to FIG. 2, an active interfering signal canceller 10 is shown as taught in U.S. Pat. No. 8,600,329 which is assigned to the same assignee as the present assignee and incorporated herein by reference. The interfering signal canceller 10 cancels an interfering signal component of an input signal, having a predetermined band of frequencies, from a desired signal component of the input signal. The input signal is fed to a primary path 12 and an auxiliary path 14. Here the input signal is an RF pulse train. The inference canceller 10 includes:

a passive isolation element 15 disposed in the primary path 12 and fed by the input signal;

a first frequency converter 16 is disposed in the auxiliary path 14 and is fed by the input signal for converting the input signal to an intermediate or baseband frequency signal;

an amplifier section 18 fed by the first frequency converter 16;

a bandpass filter section 20 tuned to the interfering signal component of the converted input signal for passing the interfering signal component of the converted input signal and for suppressing the desired signal component of the converted input signal;

a second frequency converter and phase rotator section 22 for converting and phase adjusting the passed the interfering signal component and the suppressed desired signal component to the predetermined band of frequencies;

and a combiner and time delay compensation section 24 for combining signals passed by the passive isolation element 15 and the second frequency converter and phase rotator section 22 and for compensating for time delays between the signals in passed by the passive isolator 15 and by the second frequency converter and phase rotator section 22.

The input signal having a predetermined band of frequencies (e.g., RF/microwave frequency having both the desired signal and the interfering signal of known radio frequency), is sampled and fed to the auxiliary path 14. The desired signal and the interfering signal in the auxiliary path 14 are passed through the first frequency converter 16 where they are down-converted in frequency with in-phase (I) and quadrature (Q) local oscillator signals (LOI, LOQ) and a pair of mixers as shown with the interfering signal being converted to a known intermediate frequency (IF) or baseband frequency. The frequency down-converted signal is then amplified (or attenuated) in the amplifier section 18 (here variable gain amplifiers (VGAs)) to achieve the correct amplitude for maximum cancellation. The amplified signals are then passed to the bandpass filter section 20 tuned to the interfering signal component of the converted input signal for passing the interfering signal component of the converted input signal and for suppressing the desired signal component of the converted input signal. Next, the bandpass filtered signals are fed to the second frequency converter and phase rotator section 22.

The second frequency converter and phase rotator section 22 includes mixers 32 fed by the bandpass filtered signals and by phase rotators 34. The phase rotators 34 are fed by the in-phase and quadrature local oscillator signals LOI, LOQ, as indicated. Thus, the bandpass filtered signals are fed to the second frequency converter and phase rotator section 22 for converting and phase adjusting the passed the interfering signal component and the suppressed desired signal component to the original predetermined band of frequencies while also adjusting the phase shift of the bandpass filtered signals.

Thus, the signal is sent through a bandpass filter 20, which is tuned according to the known frequency of the interfering signal, to filter out all other signals (i.e. the desired signal) leaving only the interferer/error signal in the auxiliary path that is then up-converted in frequency and phase shifted by in-phase (I) and quadrature (Q) local oscillator signals (LOI, LOQ) and fed to a pair of mixers 32 and the phase rotators 34 as shown, back to the RF/microwave frequency of interest (i.e., its original known radio frequency) for combing with the full spectrum of the signal in the primary path 12 (i.e., the input signal) to enable cancellation of the interfering signal in the primary path 12. The auxiliary path 14 performs both the frequency down-conversion and up-conversion in a pseudo-Weaver architecture to address image rejection concerns during up-conversion.

The combiner and time delay compensation section 24 combine signals passed by the passive isolation element 15 and the second frequency converter and phase rotator section 22, and also compensate for time delays between the signals passed by the primary and by the auxiliary paths. More particularly, both a time delay 40 and the passive isolator 15 are disposed in the primary path 12. More particularly, the time delay element 40, such as a delay line, is disposed between the output of the passive element 15 and a combiner 42, as shown. The time delay 40 compensates for any time delay between the primary path 12 and the auxiliary path 14 so that an RF pulse fed to the combiner 42 through the primary path 12 and to the combiner 42 through the secondary path 14 arrive at the combiner 42 at the same time for cancellation of the interfering signal.

The canceller 10 incorporates active phase rotators 22 (or vector modulators) in the LO or auxiliary path 14. This canceller 10 enables high levels of phase accuracy of the LO signals (within 1 degree) and allows accurate phase alignment of the up-converted error signal for maximum cancellation of the interferer. The use of harmonic rejection mixers 32 are used enabling the highest level of spurious free dynamic range for the up-converted signal at the output of the auxiliary path. As noted above, the time delay element 40 in the primary path 12 delays the signal propagating through the primary path 12, such that the signal will be aligned with the error signal that propagates through the auxiliary path 14. The amount of delay is approximately equal to the group delay of the bandpass filter 20 used in the auxiliary path 14.

Figure 3:
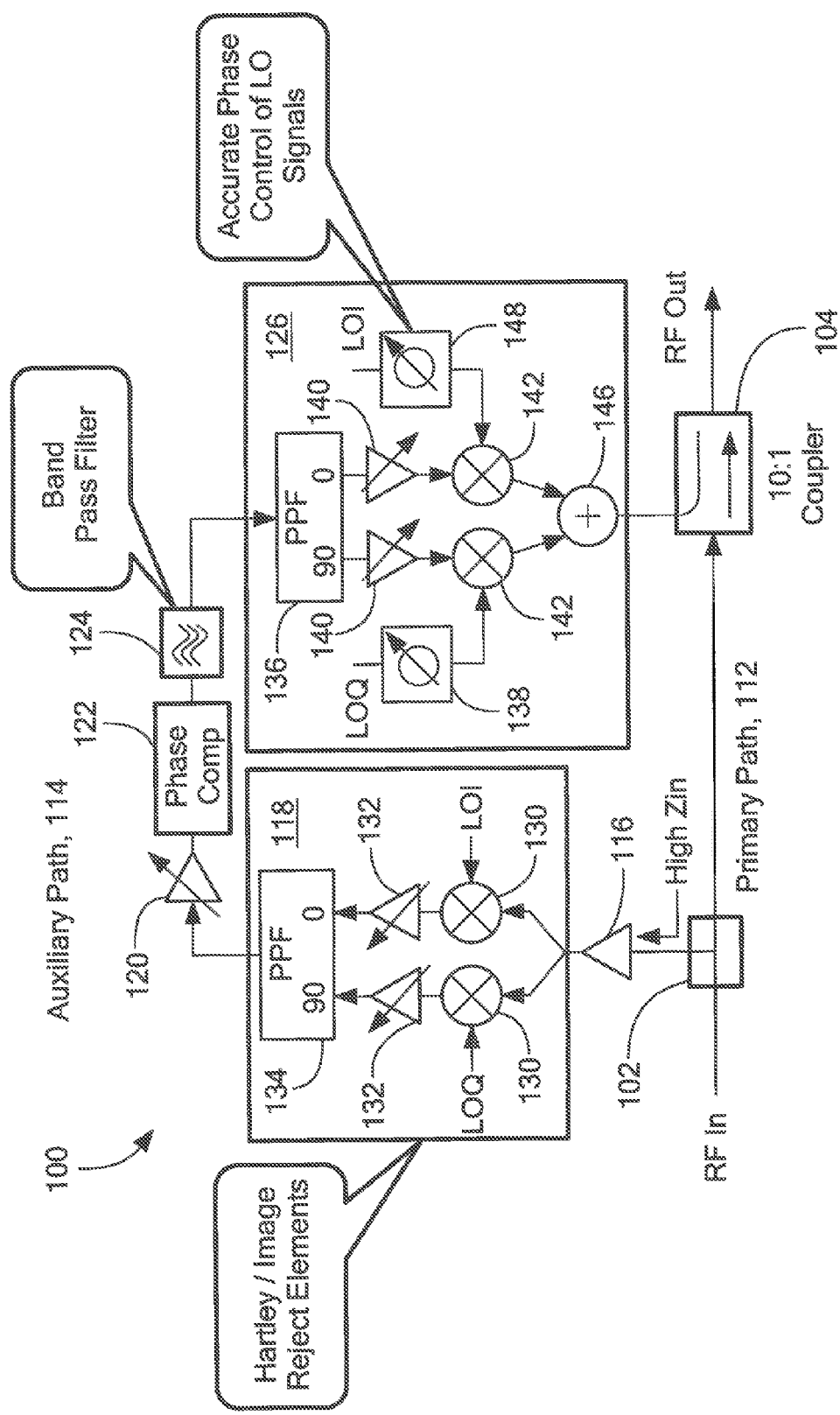
FIG. 3 is a block diagram of an interfering signal canceller with an active tunable notch filter according to the present disclosure.

Referring now to FIG. 3, an active interfering signal canceller 100 is shown having a lower noise figure than the signal canceller 10 of FIG. 2. The interfering signal canceller 100 cancels an interfering signal component of an input signal, having a predetermined band of frequencies, from a desired signal component of the input signal. The input signal is fed to a primary path 112 and an auxiliary path 114. Here the input signal is an RF pulse train. The inference canceller 100 includes a voltage sensor element 102 disposed in the primary path 112 and fed by the input signal and a coupler 104, here a 10:1 coupler, also disposed in the primary path with an output providing an output signal of the active interfering signal canceller 100. An output of the voltage sensor element 102 is fed to a first input of the coupler 104. An amplifier 116 is disposed in the auxiliary path 114 and is fed by a voltage signal indicative of the input signal from the voltage sensor 102 and amplified at the output thereof. The output of the amplifier 116 is fed to a Hartley image-reject element 118 to be described further. An output of the Hartley image-reject element 118 is fed to an amplifier 120 with an output fed to an input of a phase slope (group delay) compensator 122, be that slope positive or negative, and having an output. The output of the phase slope compensator 122 is fed to an input of a band pass filter 124 having an output. The output of the band pass filter 124 is fed to an input of an inverse Hartley image-reject element 126 to be described further. An output of the inverse Hartley image-reject element 126 is fed to a second input of the coupler 104.

The Hartley image-reject element 118 includes a pair of frequency converters 130 where signals are down-converted in frequency with in-phase (I) and quadrature (Q) local oscillator signals (LOI, LOQ) using a pair of mixers, as shown. Outputs of the frequency converters 130 are fed, respectively, to a pair of variable amplifiers 132 each having an output with one output fed to an in-phase input and the other output fed to a 90 degree phase shift input of a polyphase filter 134. An output of the polyphase filter 134 provides the output of the Hartley image-reject element 126.

The inverse Hartley image-reject element 126 includes a polyphase filter 136 having an input and an in-phase output and 90 degree phase shift output as shown. The in-phase output and the 90 degree phase shift output are respectively fed to a pair of variable amplifiers 140 with each respective output fed to a respective input of a pair of mixers 142. One of the pair of mixers 142 is also fed by an output of a phase rotator 138, here with a quadrature phase shift local oscillator signal, and the other one of the pair of mixers 142 is fed by an output of a phase rotator 148 here with an in phase local oscillator signal. Each output from the pair of mixers 142 are fed to a respective input of combiner 146 with the output of combiner 146 fed to the second input of coupler 104. With such an arrangement, many of the advantages provided by the arrangement of FIG. 2 is provided without incurring as great a noise figure in the primary path. By reducing the number of elements in the primary path, the noise figure is reduced.

With the arrangement of FIG. 3, the input signal having a predetermined band of frequencies (e.g., RF/microwave frequency having both the desired signal and the interfering signal of known radio frequency), is sampled by the voltage sensor element 102 and a voltage signal indicative of the interfering signal is fed to the auxiliary path 114. The voltage sensor 102 has a high input impedance to minimize the effect on the primary path. The voltage of the interfering signal in the auxiliary path 114 is passed through an amplifier 116 where the signal is amplified and then fed to the Hartley image-reject element 118 where the first pair of frequency converters 130 cause the signal to be down-converted in frequency with in-phase (I) and quadrature (Q) local oscillator signals (LOI, LOQ) using a pair of mixers, as shown; with the interfering signal being converted to a known intermediate frequency (IF) or baseband frequency. The in-phase and quadrature phase frequency down-converted signals are then amplified (or attenuated) by a respective one of a pair of amplifiers 132 (here variable gain amplifiers (VGAs)) to achieve the correct amplitude for maximum cancellation. The amplified signals are then passed to a polyphase filter 134 tuned to the interfering signal component of the converted input signals for passing the interfering signal component of the converted input signal. It should be noted that such an arrangement rejects the image signal of the interfering signal but passes a faithful replica of the interfering signal to be used later to cancel the interference in the Primary Path 112 upon injection in coupler 104. Next, the interfering signal is fed to an amplifier 120 to be amplified with the output signal of the amplifier 120 fed to the input of a phase compensator 122. The phase compensator 122, here a phase slope compensator, provides a group delay to the interfering signal to help maximize the cancellation of the interfering signal. The output signal of the phase slope compensator 122 is fed to an input of the band pass filter 124 where the interfering signal is passed and others are filtered out since the band pass filter 124 is tuned to the known frequency of the interfering signal, to filter out all other signals (i.e. the desired signal) leaving only the interferer/error signal in the auxiliary path. The signal from the output of the band pass filter is fed to the input of the inverse Hartley image-reject element 126. Here, the signal is passed through the polyphase filter 136 which provides an in-phase output signal and 90 degree phase shift output signal. The in-phase output signal and the 90 degree phase shift output signal are respectively fed to a pair of variable amplifiers 140 with each respective amplified output signal fed to a respective input of a pair of mixers 142. One of the pair of mixers 142 is also fed by a quadrature phase shift local oscillator signal, and the other one of the pair of mixers 142 is also fed by an in phase local oscillator signal. Each output signal from the pair of mixers 142 are fed to a respective input of combiner 146 with the output signal of combiner 146 fed to the second input of coupler 104. It should be appreciated that the phase rotator 138 and the phase rotator 148 can accurately control the phase of the local oscillator signal so that the output of the mixers are tightly within the frequency range of the interfering signal as adjusted by phase. With the above arrangement and by compensating the phase slope of the interfering baseband signal using phase slope compensator 122, the signals from the auxiliary path 114 are coupled with the signals in the primary path 112 so that an RF pulse fed to the coupler 104 through the primary path 112 and to the coupler 104 through the secondary path 114 arrive at the coupler 104 at the same time for cancellation of the interfering signal.

The canceller 100 incorporates active phase rotators 138 and 148 (or vector modulators) in the LO or auxiliary path 144. The canceller 100 enables high levels of phase accuracy of the LO signals (within 1 degree) and allows accurate phase alignment of the up-converted error signal for maximum cancellation of the interferer. The use of harmonic rejection mixers 142 are used enabling the highest level of spurious free dynamic range for the up-converted signal at the output of the auxiliary path.

Figure 4A:
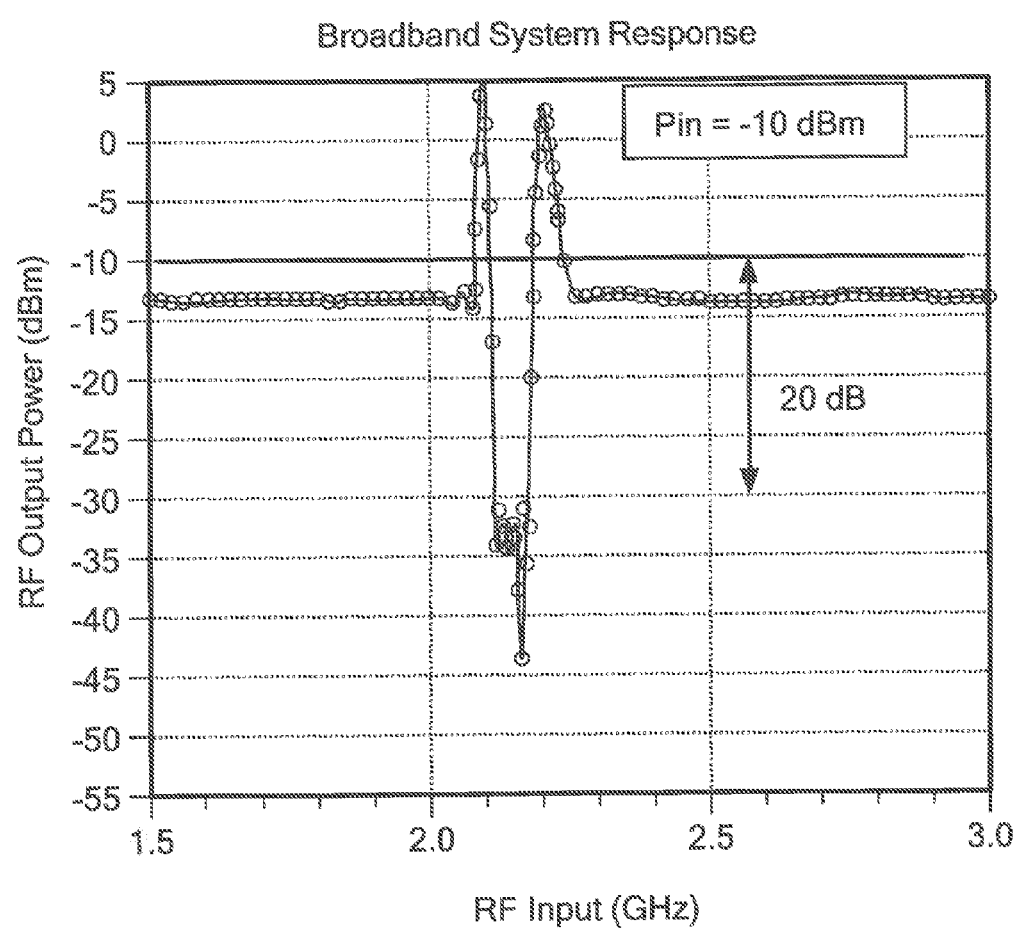
FIGS. 4A and 4B show the system response using a dual Hartley approach of the canceller of FIG. 3.
Figure 4B:
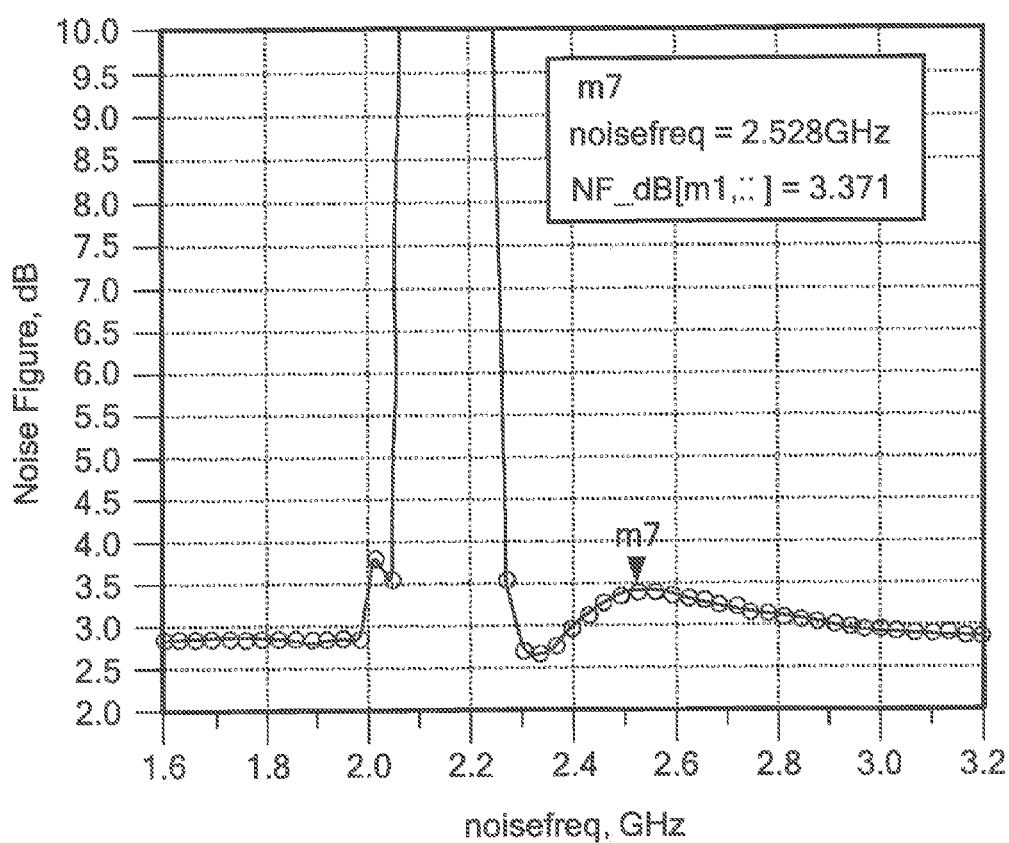

FIG. 4A shows the broadband response of the system with the active cancellation using the Hartley approach of FIG. 3. FIG. 4B shows the noise figure using the Hartley approach of FIG. 3.

Figure 5A:
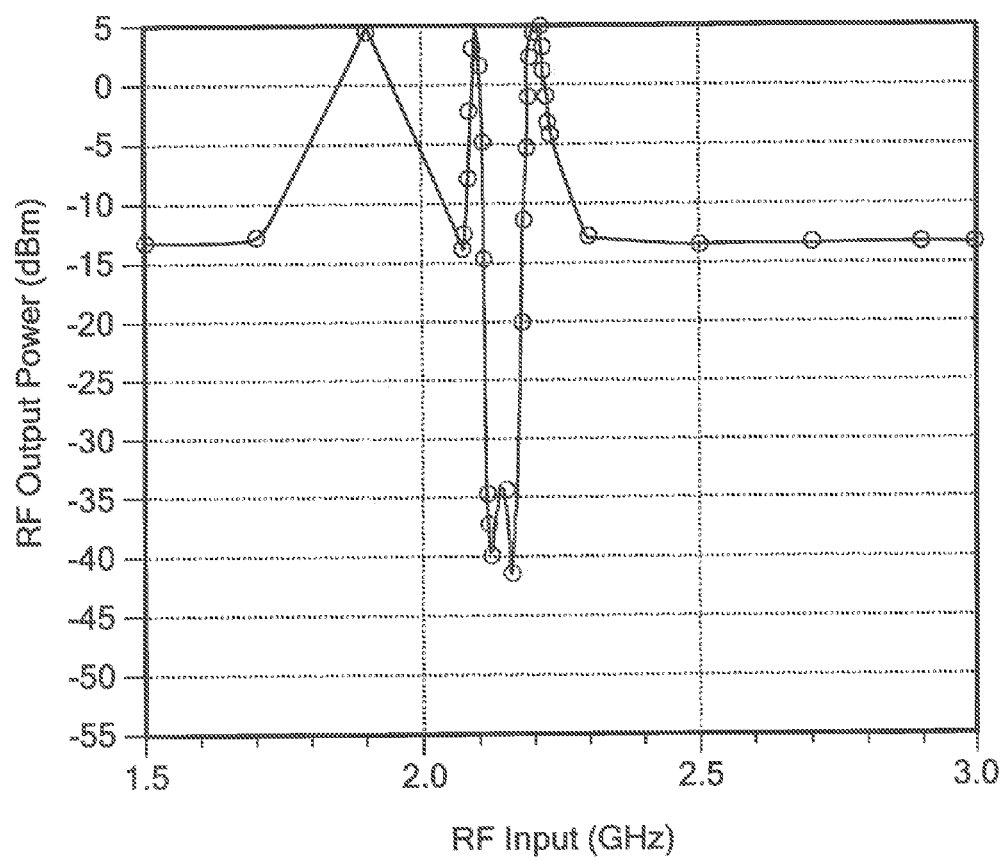
FIGS. 5A and 5B show the system response without using a dual Hartley approach of the canceller of FIG. 3.
Figure 5B:
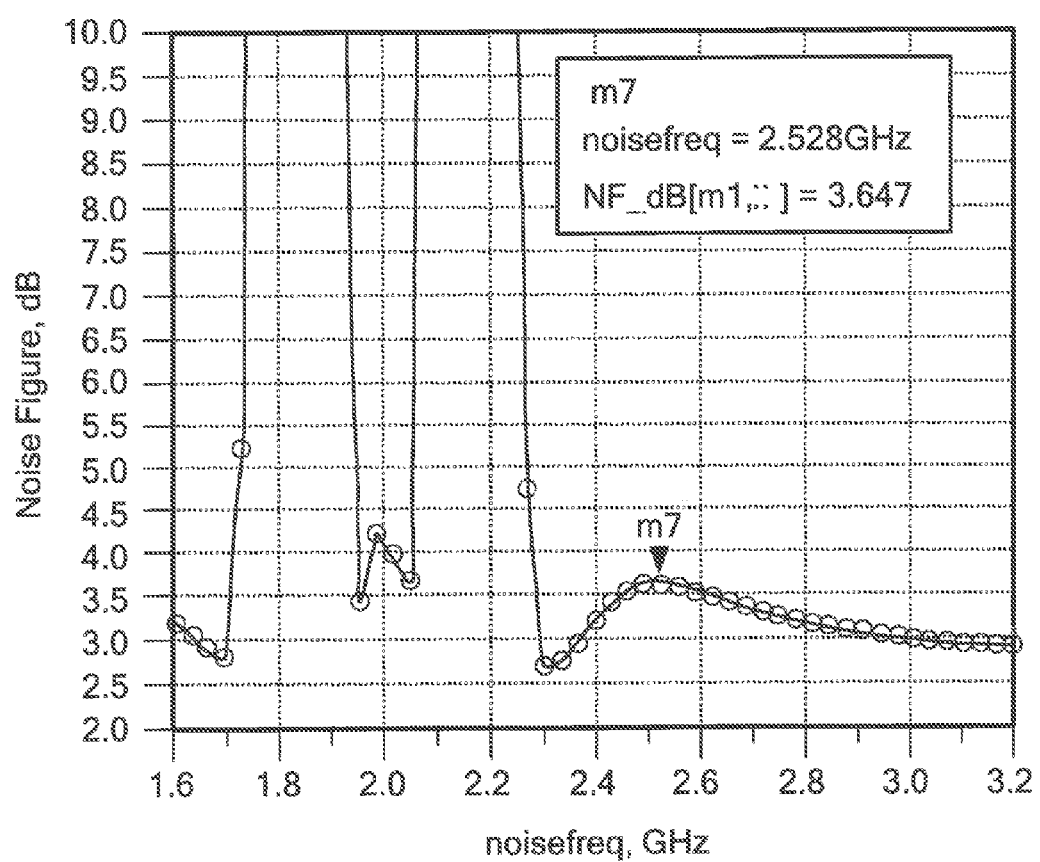

FIG. 5A shows the broadband response of the system with the active cancellation not using the Hartley approach of FIG. 3. FIG. 5B shows the noise figure not using the Hartley approach of FIG. 3.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:
    a voltage sensor element disposed in the primary path and fed by the input signal;
    a coupler disposed in the primary path and fed by the voltage sensor element;
    a Hartley image-reject element disposed in the auxiliary path and fed by the input signal for converting the input signal to an intermediate or baseband frequency signal;
    a phase slope compensator disposed in the auxiliary path after the Hartley image-reject element to phase adjust an interfering signal component of a converted input signal; and
    an inverse Hartley image-reject element disposed in the auxiliary path after the phase slope compensator to convert the passed the interfering signal component to the predetermined band of frequencies and having an output fed to the coupler.

2. The canceller recited in claim 1 comprising an amplifier disposed in the auxiliary path between the Hartley image-reject element and the phase slope compensator.

3. The canceller recited in claim 1 comprising an amplifier disposed in the auxiliary path between the voltage sensor and the Hartley image-reject element.

4. The canceller recited in claim 1 wherein the Hartley image-reject element comprises:
    a pair of mixers each having an output;
    a pair of amplifiers, each having an input and an output, the input connected to a respective output of the pair of mixers; and
    a polyphase filter having two inputs and an output, the two inputs fed be a respective one of the outputs of the pair of amplifiers, the output of the polyphase filter providing the output of the Hartley image-reject element.

5. The canceller recited in claim 1 comprising: a band pass filter disposed in the auxiliary path after the phase slope compensator, the band pass filter tuned to the interfering signal component of a converted input signal for passing the interfering signal component of the converted input signal and for suppressing the desired signal component of the converted input signal.

6. The canceller recited in claim 1 wherein the inverse Hartley image-reject element comprises:
    a polyphase filter having an input and two outputs:
    a pair of amplifiers, each amplifier having an input and an output, the input connected to a respective output of the polyphase filter,
    a pair of phase rotators, each having an input and an output;
    a pair of mixers each having two inputs and an output; one of the inputs of one of the pair of mixers connected to a respective output of one of the pair of amplifiers and the other one of the inputs of one of the pair of mixers connected to a respective output of one of the pair of phase rotators; and
    a combiner to combine signals passed by the pair of mixers and to provide the output of the inverse Hartley image-reject element.

7. The canceller recited in claim 1 wherein the second frequency converter and phase rotator section, comprises: a phase rotator fed by a local oscillator signal; and a second frequency converter fed by the phase rotator and the bandpass filter.

8. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:
    a Hartley image-reject element disposed in the auxiliary path and fed by the input signal for converting the input signal to an intermediate or baseband frequency signal;
    a phase slope compensator disposed in the auxiliary path after the Hartley image-reject element to phase adjust an interfering signal component of a converted input signal;
    an inverse Hartley image-reject element disposed in the auxiliary path after the phase slope compensator to convert the passed interfering signal component to the predetermined band of frequencies and having an output fed to the primary path.

9. The canceller recited in claim 8 comprising: a voltage sensor element disposed in the primary path and fed by the input signal.

10. The canceller recited in claim 8 comprising a coupler disposed in the primary path and fed by the voltage sensor element.

11. The canceller recited in claim 8 comprising an amplifier disposed in the auxiliary path between the Hartley image-reject element and the phase slope compensator.

12. The canceller recited in claim 8 comprising an amplifier disposed in the auxiliary path between the voltage sensor and the Hartley image-reject element.

13. The canceller recited in claim 8 wherein the Hartley image-reject element comprises:
    a pair of mixers each having an output;
    a pair of amplifiers, each having an input and an output, the input connected to a respective output of the pair of mixers; and
    a polyphase filter having two inputs and an output, the two inputs fed be a respective one of the outputs of the pair of amplifiers, the output of the polyphase filter providing the output of the Hartley image-reject element.

14. The canceller recited in claim 8 comprising: a band pass filter disposed in the auxiliary path after the phase slope compensator, the band pass filter tuned to the interfering signal component of a converted input signal for passing the interfering signal component of the converted input signal and for suppressing the desired signal component of the converted input signal.

15. The canceller recited in claim 8 wherein the inverse Hartley image-reject element comprises:
    a polyphase filter having an input and two outputs:
    a pair of amplifiers, each amplifier having an input and an output, the input connected to a respective output of the polyphase filter, a pair of phase rotators, each having an input and an output;

a pair of mixers each having two inputs and an output; one of the inputs of one of the pair of mixers connected to a respective output of one of the pair of amplifiers and the other one of the inputs of one of the pair of mixers connected to a respective output of one of the pair of phase rotators; and a combiner to combine signals passed by the pair of mixers and to provide the output of the inverse Hartley image-reject element.

16. An interfering signal canceller for cancelling an interfering signal component of an input signal, having a predetermined band of frequencies, from a desired signal component of the input signal, wherein the input signal is fed to a primary path and an auxiliary path, the interfering signal canceller comprising:

a voltage sensor element disposed in the primary path and fed by the input signal;

a coupler disposed in the primary path and fed by the voltage sensor element;

a Hartley image-reject element disposed in the auxiliary path and fed by the input signal for converting the input signal to an intermediate or baseband frequency signal wherein the Hartley image-reject element comprises:

a pair of mixers each having an output;

a pair of amplifiers, each having an input and an output, the input connected to a respective output of the pair of mixers; and a polyphase filter having two inputs and an output, the two inputs fed be a respective one of the outputs of the pair of amplifiers, the output of the polyphase filter providing the output of the Hartley image-reject element;

a phase slope compensator disposed in the auxiliary path after the Hartley image-reject element to phase adjust an interfering signal component of a converted input signal;

an inverse Hartley image-reject element disposed in the auxiliary path after the phase slope compensator to convert the passed the interfering signal component to the predetermined band of frequencies and having an output fed to the coupler.

17. The canceller recited in claim 16 wherein the inverse Hartley image-reject element comprises:

a polyphase filter having an input and two outputs:

a pair of amplifiers, each amplifier having an input and an output, the input connected to a respective output of the polyphase filter;

a pair of phase rotators, each having an input and an output;

a pair of mixers each having two inputs and an output; one of the inputs of one of the pair of mixers connected to a respective output of one of the pair of amplifiers and the other one of the inputs of one of the pair of mixers connected to a respective output of one of the pair of phase rotators; and a combiner to combine signals passed by the pair of mixers and to provide the output of the inverse Hartley image-reject element.

18. The canceller recited in claim 16 comprising an amplifier disposed in the auxiliary path between the Hartley image-reject element and the phase slope compensator.

19. The canceller recited in claim 16 comprising an amplifier disposed in the auxiliary path between the voltage sensor and the Hartley image-reject element.

20. The canceller recited in claim 16 comprising: a band pass filter disposed in the auxiliary path after the phase slope compensator, the band pass filter tuned to the interfering signal component of a converted input signal for passing the interfering signal component of the converted input signal and for suppressing the desired signal component of the converted input signal.

* * * * *